US011420370B2

United States Patent
De Nadai et al.

(10) Patent No.: US 11,420,370 B2
(45) Date of Patent: Aug. 23, 2022

(54) DEVICE TO ADJUST THE LINEAR POSITION OF A SHUTTER

(71) Applicant: INGLASS S.P.A., San Polo di Piave (IT)

(72) Inventors: Massimo De Nadai, San Polo di Piave (IT); Massimo Rossi, San Polo di Piave (IT); Massimo Bisetto, San Polo di Piave (IT)

(73) Assignee: INGLASS S.P.A., San Polo di Piave (IT)

(*) Notice: Subject to any disclaimer, the term of this patent is extended or adjusted under 35 U.S.C. 154(b) by 0 days.

(21) Appl. No.: 17/259,586

(22) PCT Filed: Jul. 10, 2019

(86) PCT No.: PCT/IB2019/055871
§ 371 (c)(1),
(2) Date: Jan. 12, 2021

(87) PCT Pub. No.: WO2020/012374
PCT Pub. Date: Jan. 16, 2020

(65) Prior Publication Data
US 2021/0331362 A1 Oct. 28, 2021

(30) Foreign Application Priority Data

Jul. 12, 2018 (IT) .................. 102018000007152

(51) Int. Cl.
*B29C 45/28* (2006.01)
(52) U.S. Cl.
CPC .................. *B29C 45/28* (2013.01)

(58) Field of Classification Search
CPC ............... B29C 45/28; B29C 45/2806; B29C 2045/2824; B29C 2045/2844; B29C 2045/282; B29C 2045/2837; B29C 45/281; B29C 45/2896
See application file for complete search history.

(56) References Cited

U.S. PATENT DOCUMENTS

| 5,078,589 A * | 1/1992 | Osuna-Diaz ........ B29C 45/2806 264/297.2 |
| 5,670,190 A * | 9/1997 | Osuna-Diaz .......... B29C 45/281 425/564 |
| 6,183,239 B1 * | 2/2001 | Belous .................... B29C 45/27 425/564 |
| 2006/0134253 A1* | 6/2006 | Edler .................. B29C 45/2703 425/155 |

(Continued)

FOREIGN PATENT DOCUMENTS

| DE | 102010032340 A1 | 2/2012 |
| EP | 3003681 A1 | 4/2016 |

*Primary Examiner* — Niki Bakhtiari
*Assistant Examiner* — Emmanuel S Luk
(74) *Attorney, Agent, or Firm* — Mark M. Friedman

(57) ABSTRACT

A device is described for adjusting the linear position of one or more shutters (20) in an injection moulding system. The device comprises a body, comprising a cavity in which there can axially slide a movable element, and an adjustment element for adjustment of the axial position of the body with respect to a plate. The adjustment element is rotatably mounted between the body and the plate and comprises a threaded portion on which a corresponding thread of the body and/or of the plate is engaged.

15 Claims, 5 Drawing Sheets

(56) References Cited

U.S. PATENT DOCUMENTS

| | | | |
|---|---|---|---|
| 2008/0199553 A1* | 8/2008 | Fairy | B29C 45/281 425/146 |
| 2011/0241238 A1* | 10/2011 | Trakas | F16K 49/00 264/39 |
| 2016/0082634 A1* | 3/2016 | Tan | B29C 45/281 425/564 |
| 2018/0186051 A1* | 7/2018 | Lee | B29C 45/281 |
| 2018/0272587 A1* | 9/2018 | Galati | B29C 45/76 |
| 2019/0358878 A1* | 11/2019 | Lee | B29C 45/1775 |

* cited by examiner

DEVICE TO ADJUST THE LINEAR POSITION OF A SHUTTER

The invention relates to a device to adjust the linear position of a shutter in an injection molding system.

Known injection molding systems typically use a hydraulic, pneumatic or electric device to adjust one or more shutters regulating the flow of molten material towards one or more cavities of the mold. The device has for this purpose a piston movable inside an outer casing fixed to a hot runner, to a mold plate, or to another support element.

A recent device is described in EP 3003681.

It includes a fixed upper mounting plate and an adjustment screw or threaded ring to change the axial position of the shutter. The threaded ring is screwed inside the mounting plate and by screwing it clockwise and counter-clockwise it can be moved axially. Then with a screw an interconnection is created between the adjustment threaded ring and a body that contains a movable element connected to the shutter, thus determining an end stroke for the shutter itself.

This solution has disadvantages, because there may be adjustment errors due to the intrinsic need of screwing consecutively two threaded elements in series, which introduces tolerance and thermal expansion problems. Furthermore, the interconnection screw is small in size, and could give problems during maintenance (gripping).

The main object of the invention is to remedy one or more of the aforementioned problems. Another object is to propose a device of the aforementioned type which shows some improvement.

The device is defined in the appended claims, in which the dependent ones define advantageous variants.

The device works to adjust the linear position of one or more shutters in an injection molding system, wherein the shutter can open and/or close a molten-fluid supply channel to one or more mold cavities by translating along an axis. To adjust the shutter's end of stroke, the device comprises:
- a body comprising a cavity in which there can slide axially a movable element, to which the one or more shutters can be fixed;
- a fixed support plate,
- an adjustment element for adjustment of the axial position of the body, wherein the adjustment element
  - is rotatably mounted between the body and the plate,
    - is connected to the body and to the plate so that it can be rotated clockwise and/or counter-clockwise so as to move linearly parallel to said axis in order to define the position of the body along said axis, and comprises a threaded portion on which a corresponding thread of the body and/or of the support plate is engaged.

Thus, by turning the adjustment element more or less, one can translate the body along said axis, obtaining the adjustment of the end of stroke.

The adjustment element may be coupled to the body and to the support plate in different ways. E.g. the adjustment element may have only one threaded portion, which is engaged with a corresponding thread of the support plate or body. Or the adjustment element may have two threaded portions which are respectively engaged on a corresponding thread of the support plate and body.

In the first case (single thread), the adjustment element may have a (e.g. external) thread (such as thread 62 in the figures) while internally it has no thread; and the coupling between the body and the adjustment element is not of the threaded type, but for example by sliding interlocking or by abutting parts. In this variant there is no relative translation between the adjustment element and the body but only between the adjustment element and the support plate.

In another variant of the single thread, the adjustment element may have a (for example internal) thread (as for example the thread 64 of the figures) engaged on a thread of the body, while externally the adjustment element is devoid of any thread. When the adjustment element is rotated, the body translates with respect to the adjustment element, while the adjustment element rotates with respect to the support plate but remains in axial stationary position with respect to the support plate.

In the second case (double thread), the adjustment element is mounted screwably into the support plate, and can be screwed clockwise and/or counter-clockwise inside the support plate to move linearly and define an axial position of the body, and the body and the support plate comprise threaded portions on which the adjustment element is engaged simultaneously with corresponding threads of its own. Therefore, by screwing more or less the adjustment element into the plate one is able to translate the body along said axis, obtaining the adjustment of the end-of-stroke.

The device has e.g. a movable piston inside an outer casing fixed to the hot runner, or to a plate of the mold, or to another support element.

According to a preferred variant, the threaded portions of the body and of the support plate and the corresponding threads of the adjustment element are concentric to said axis. In this way the symmetry of the device simplifies the construction. A solution with threads non-concentric to the shutter axis is also possible.

According to a preferred variant, the body comprises a male portion, e.g. a central neck, which is externally threaded and protrudes along said axis from an end of the body, and on the male portion there is a thread engaged by a thread present in a corresponding female portion of the adjustment element. This solution facilitates the coupling between the body and the adjustment element, while ensuring at the same time symmetry of the structure and robustness. Or the adjustment element could comprise a male part that can be screwed into a complementary female part of the body (the male part in this case would be externally equipped with a thread).

According to a preferred variant the adjustment element comprises threads formed on one of its outer and inner side walls, in order to simplify the construction of the adjustment element. Said internal side wall can correspond to a pass-through or blind opening of the adjustment element.

To improve the efficiency and reliability of the system, preferably the device comprises blocking means or elements for blocking the adjustment element with respect to the plate and/or the body.

The blocking means or elements can be implemented in different ways.

In a variant, the blocking means or elements are mounted on the adjustment element. E.g. the adjustment element comprises deformable portions able to be pushed with pressure against the plate and/or the body to block the adjustment element with respect to the plate and/or the body. E.g. the adjustment element may comprise two concentric threaded rings that are axially spaced apart and able to be spread apart and pressed with pressure against a corresponding thread of the plate and/or body. The two concentric threaded rings are preferably equal and/or of equal diameter, for ease of construction.

In a different variant, the blocking means or elements are mounted on the fixing plate. E.g. the fixing plate comprises deformable portions able to be pushed with pressure against the adjustment element to block it. Or the fixing plate comprises blocking elements able to be pushed against the adjustment element to block it.

The advantages of the invention will be even clearer from the following description of a preferred device, in which reference is made to the annexed drawing in which FIG. 1 shows a three-dimensional view of the device;

In the figures: identical numerical references indicate equal elements, and parts are described as in use.

Figure 1:
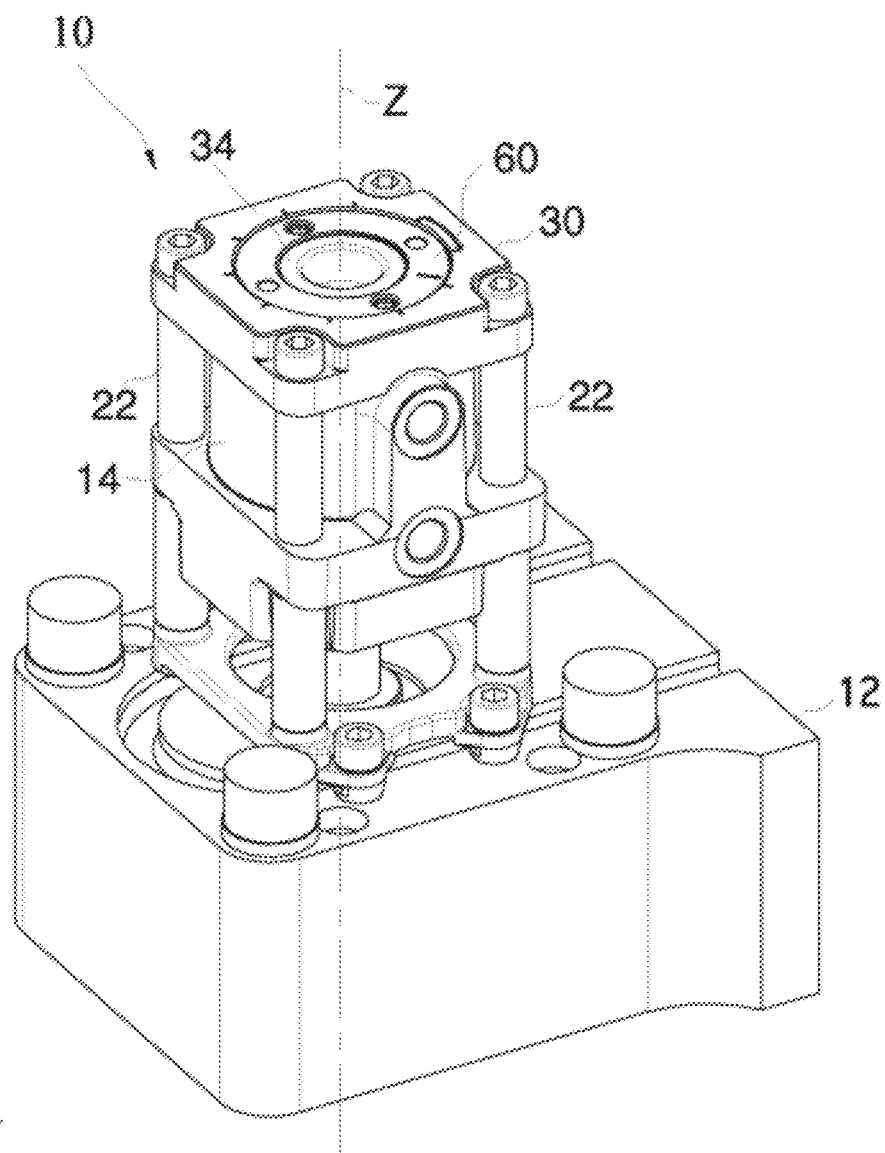

A device 10 for adjusting the linear position of a shutter 20 in an injection molding system 12 (shown only partially) is illustrated altogether in FIG. 1. The shutter 20 in a known manner can open and/or close a molten fluid channel supplying a mold cavity (not shown) by moving forward and/or backward along a Z axis.

Figure 2:
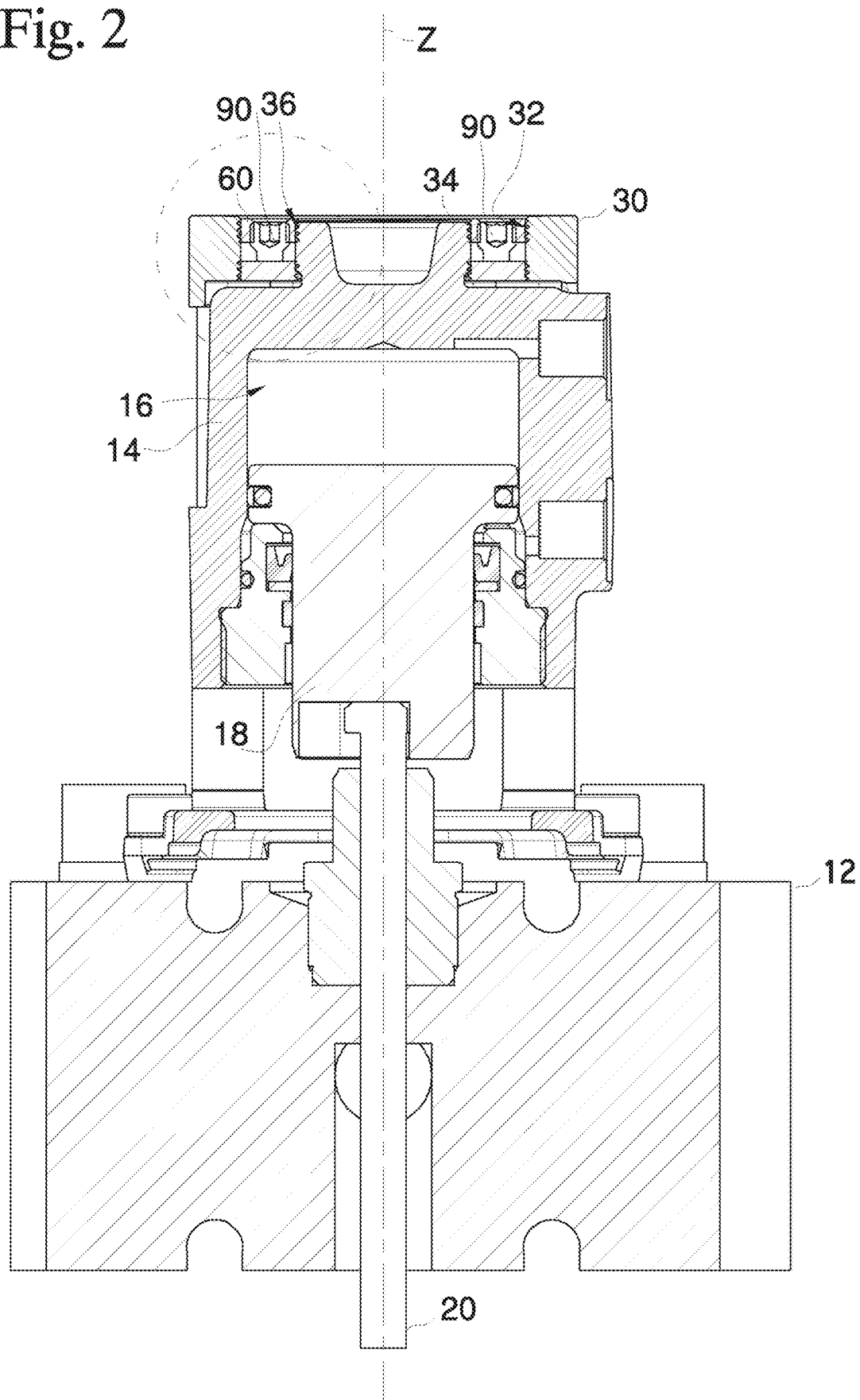
FIG. 2 shows a cross-sectional view of the device.

The device 10 comprises an outer body 14 which delimits (see FIG. 2) an internal cavity 16 in which a piston 18 can slide axially and be directly or indirectly connected to the shutter 20. The linear displacement of the piston 18 involves the linear displacement of the shutter 20 along the Z axis.

The outer body 14 is slidably mounted on columns 22 to be linearly translatable along Z with respect to the system 12, and therefore define an adjustable end of stroke for the shutter 20. The outer body 14 comprises an upper circular neck 34 which protrudes upwardly along Z and is externally equipped with a thread 36.

On the top of the columns 22 there is mounted an upper support plate 30, fixed with respect to the system 12 and lying on a plane orthogonal to the Z axis.

The plate 30 has in its center a circular pass-through opening on whose side walls there is a thread 32. Such opening serves to house an adjustment ring nut 60 (see also FIG. 5), which is provided externally with a thread 62 and in turn comprises a pass-through or blind central circular cavity 66 on whose side walls there is a thread 64 (see FIG. 5).

The ring nut 60 is sized and mounted so that the thread 64 is engaged on the thread 36 of the neck 34 and the thread 62 is engaged on the thread 32 of the plate 30. In this way the ring nut 60 can be screwed clockwise and/or counter-clockwise inside the plate 30 to move linearly along the Z axis and simultaneously move the body 14 along the Z axis.

From the foregoing it is understood that the device 10 allows defining easily an axial position of the body 14 along Z, a condition that automatically establishes the upper stroke limit for the piston 18. It is enough to screw more or less the ring nut 60 into the plate 30 so that the ring nut 60, by reaction, moves the neck 34 up or down along the Z axis.

It is preferable to be able to lock the ring nut 60 in place after adjustment, to ensure precision and repeatability in the molding processes.

Figure 3:
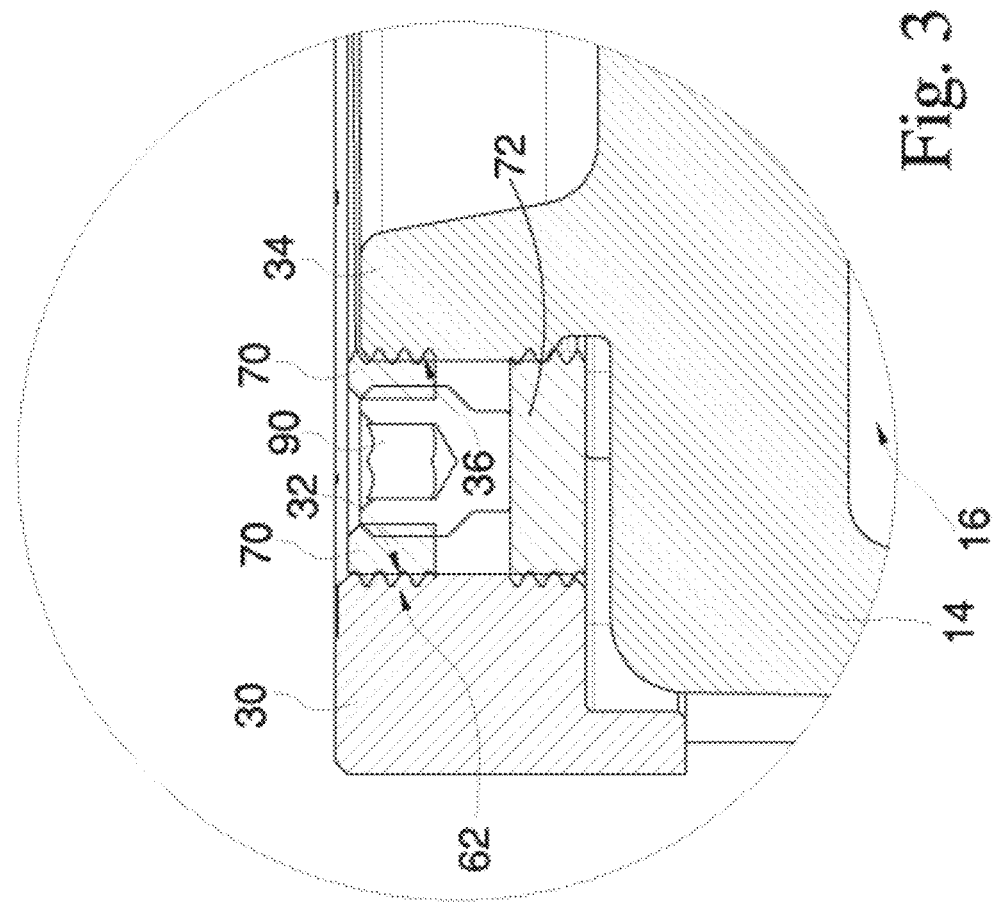
FIG. 3 shows an enlargement of the dotted circle in FIG. 2.

For this purpose, a preferred construction of the ring nut 60 (FIG. 5) provides for it to comprise two equal parallel threaded discs 70, 72 axially separated by a diametral connection 74, also equipped with a thread. A similar structure can e.g. be obtained by milling laterally a threaded cylinder. Disc 70 is the one on the opposite side with respect to the body 14, and has pass-through, internally threaded holes 76. By screwing a threaded dowel 90 (FIG. 3) into one or more holes 76 until the underlying disc 72 is touched by the dowel 90, the two discs 70, 72 can be slightly spread apart so as to press the threads 62, 32 one against the other.

The thus enhanced friction between the threads 62, 32 achieves the locking of the ring nut 60.

More generally, a preferred solution for the ring nut 60 provides that it has a deformable geometry or portion. The deformable portion is capable to cooperate with an external element, e.g. a screw, capable of deforming the/a thread of the ring nut to ensure blocking thereof.

Or, another preferred solution for the ring nut provides that in the ring nut there are made e.g. one or more holes inside which one or more threaded dowels can be inserted. The dowels are able to spread apart the upper and lower flaps of the ring nut thus achieving its locking.

Figure 4:
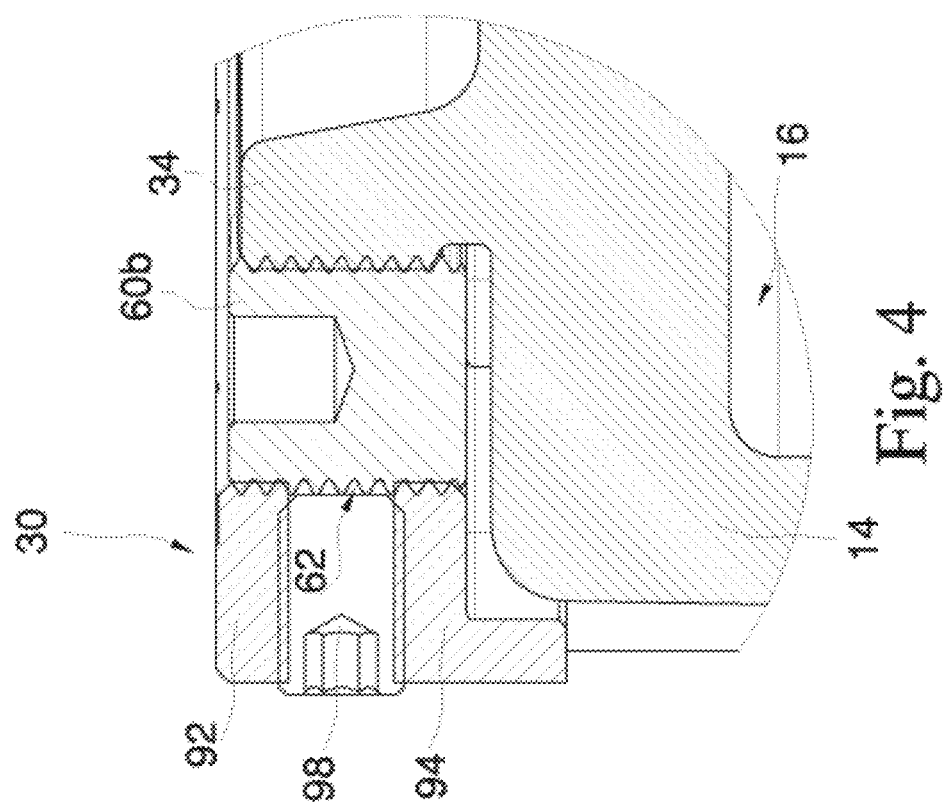
FIG. 4 shows a variant of the device.
Figure 5:
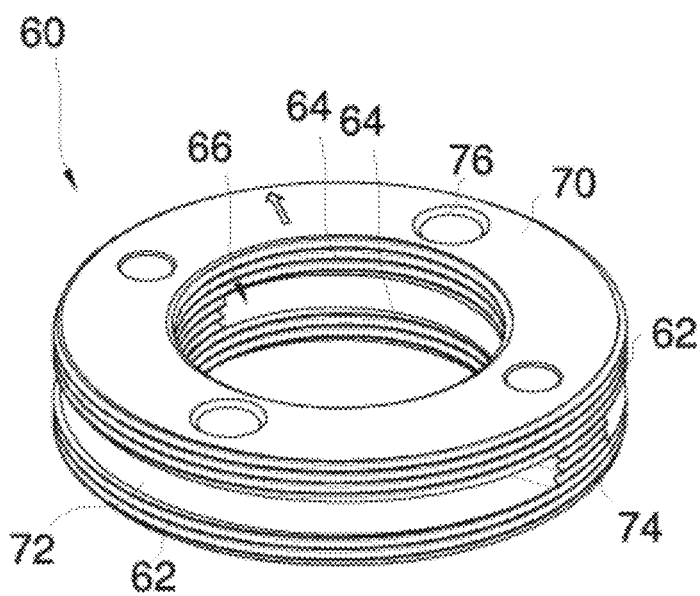
FIG. 5 shows enlarged a ring of the device.

Another variant for locking the ring nut is shown in FIG. 4. For the ring nut the splayable/deformable structure of FIG. 5 is no longer necessary, and it can be a simple full ring nut, indicated with 60b. Through a hole in the plate 30 one or more dowels can be inserted to lock laterally the adjustment ring nut. Here a dowel blocks the position of the ring nut 60b by exerting pressure on the external thread of the ring nut 60b.

A further solution for locking the adjustment ring nut envisages the use of a further locking plate cooperating with one or more connection elements, for example plugs, able to lock the adjustment ring nut.

Or the plate 30 may have a splayable/deformable structure for locking a ring nut 60b (FIG. 4). In particular, the plate 30 comprises an outermost lip 92 integral with a base plate 94 except for radials openings in which a dowel 98 can be inserted along a plane orthogonal to the Z axis. The dowel 98 can divaricate the lip 92 with respect to the base plate 94, with the effect described above on the threads 32, 62, or interfere on/with the thread 62 to lock the ring nut 60b.

The invention claimed is:

1. A device for adjusting the linear position of one or more shutters in an injection moulding system, wherein the one or more shutters can open and/or close a molten-fluid supply channel towards one or more mould cavities by translating along an axis, the device comprising:
    a body comprising a cavity in which there can slide axially a movable element, to which the one or more shutters can be fixed;
    a fixed support plate,
    an adjustment element for adjustment of the axial position of the body,
    wherein the adjustment element is rotatably mounted between the body and the fixed support plate,
    is connected to the body and to the fixed support plate so that it can be rotated clockwise and/or counter-clockwise so as to move linearly parallel to said axis in order to define the position of the body along said axis,
    and comprises a threaded portion on which a corresponding thread of the body and of the fixed support plate is engaged.

2. The device according to claim 1, wherein the adjustment element is mounted in a screwable manner in the fixed support plate and can be screwed clockwise and/or counter-clockwise inside the fixed support plate to move linearly and define an axial position of the body, the body and the fixed support plate comprising said corresponding thread on which the adjustment element is simultaneously engaged with said threaded portion of its own.

3. The device according to claim 1, wherein the threaded portions and the corresponding threads are concentric to said axis.

4. The device according to claim 1, wherein the body comprises an externally threaded male portion which protrudes along said axis from an end of the body, on the male portion being present said corresponding thread engaged by said threaded portion provided in a complementary female portion of the adjustment element.

5. The device according to claim 1, wherein the adjustment element comprises threads formed on an external and internal side wall thereof.

6. The device according to claim 5, wherein said threaded inner side wall belongs to a pass-through or blind opening.

7. The device according to claim 1, comprising blocking means for blocking the adjustment element with respect to the fixed support plate and/or the body.

8. The device according to claim 7, wherein the blocking means are mounted on the adjustment element.

9. The device according to claim 8, wherein the adjustment element comprises deformable portions able to be pushed with pressure against the fixed support plate and/or the body to block the adjustment element relative to the fixed support plate and/or the body.

10. The device according to claim 1, wherein the body comprises a female portion on which said corresponding thread is provided and engaged by said corresponding threaded portion present in a complementary male portion of the adjustment element.

11. The device according to claim 7, wherein the blocking means are mounted on the fixed support plate.

12. The device according to claim 7, wherein the fixed support plate comprises deformable portions able to be pushed with pressure against the adjustment element to block it.

13. The device according to claim 7, wherein the fixed support plate comprises blocking elements able to be pushed against the adjustment element to block it.

14. The device according to claim 8, wherein the adjustment element comprises two concentric threaded rings that are axially spaced apart and able to be spread apart and pressed with pressure against a corresponding thread of the fixed support plate and/or body.

15. The device according to claim 14, wherein the two concentric threaded rings are equal and/or of equal diameter.

* * * * *